E. G. MUNSON.
AXIALLY ADJUSTABLE BALL BEARING.
APPLICATION FILED NOV. 5, 1914.
1,141,201.
Patented June 1, 1915.
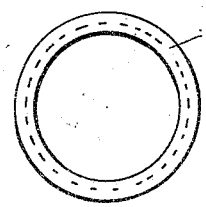
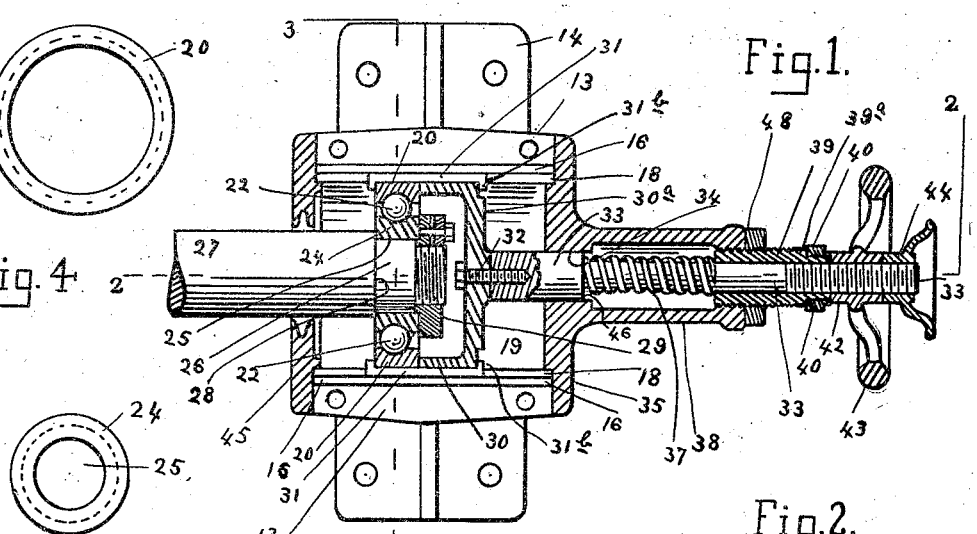
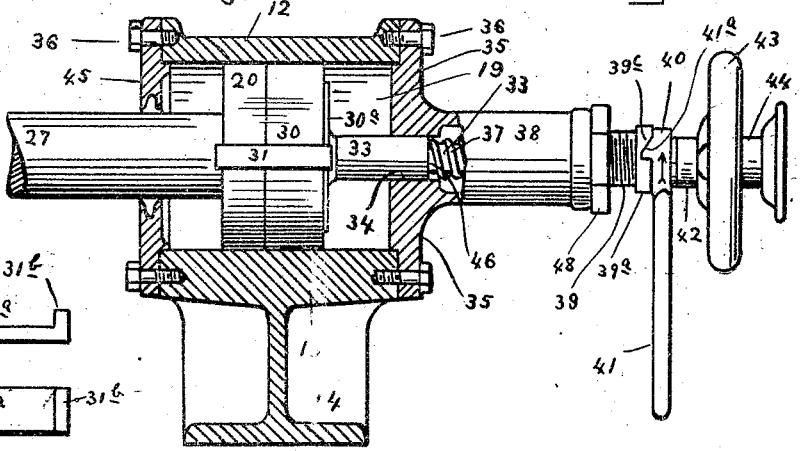
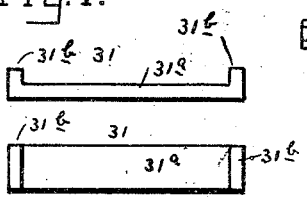
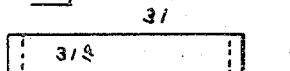
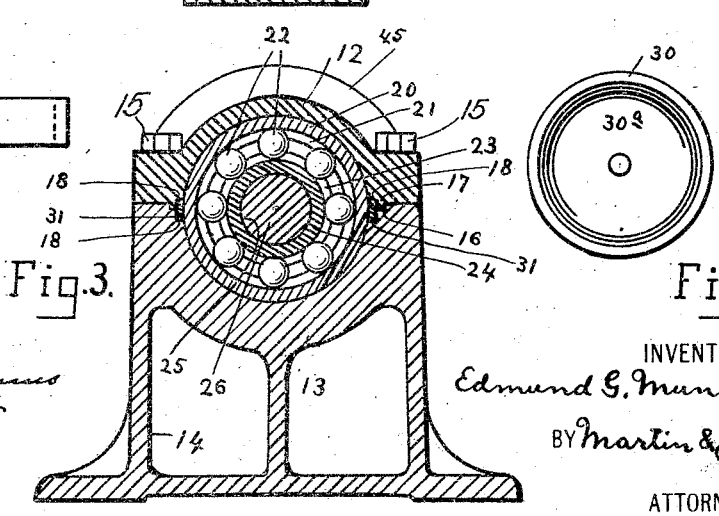
WITNESSES:
Harriet Williams
H. K. Owens
INVENTOR
Edmund G. Munson
BY Martin & Jones
ATTORNEYS

UNITED STATES PATENT OFFICE.

EDMUND G. MUNSON, OF WHITESBORO, NEW YORK, ASSIGNOR TO MUNSON BROTHERS COMPANY, OF WHITESBORO, NEW YORK.

AXIALLY-ADJUSTABLE BALL-BEARING.

1,141,201.  Specification of Letters Patent.  Patented June 1, 1915.

Application filed November 5, 1914. Serial No. 870,394.

*To all whom it may concern:*

Be it known that I, EDMUND G. MUNSON, of Whitesboro, in the county of Oneida and State of New York, have invented certain new and useful Improvements in Axially-Adjustable Ball-Bearings; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to axially adjustable ball bearings.

The purpose of my invention is to provide an axially adjustable bearing of improved but simple construction and one efficient and durable in operation.

It is a further purpose of my invention to provide a ball bearing of the class described so constructed that the ball race member may be axially movable in its mounting without interfering with the desired freedom of said ball race member to rotate in its mounting, or to slightly rotate "or creep" therein in the manner usual to this part of such a ball bearing.

A further purpose of my invention is to provide such a construction as will admit of axial adjustment of the ball bearing in its mounting and engagement of the ball race member with, and if desired rotation of the ball race member, in said mounting without interfering with the ball race member resting or moving directly in said mounting.

A still further purpose of my invention is to provide a ball bearing having a positive connection with one of the ball race members for axial adjustment of the bearing in its mounting in combination with either positive or yielding, or both positive and yielding means, operatively connected to said connection for moving or holding the ball bearing in desired axial position.

Further advantages and objects of my invention will appear from the specification and claims herein set forth.

Figure 1 is a horizontal sectional view of an axially adjustable ball bearing embodying my invention. Fig. 2 is a side elevation thereof with the mounting in vertical sectional view on line 2—2 of Fig. 1. Fig. 3 is a vertical cross-sectional view on line 3—3 of Fig. 1. Figs. 4 and 5 are edge views of the outer and inner ball race members respectively. Fig. 6 is an inner side view of the cup-shaped thrust collar. Figs. 7, 8 and 9 are respectively edge, inside, and outside views on an enlarged scale of the clamp connecting the outer ball race member and the thrust collar.

Referring to the drawings in a more particular description, there is provided an elongated mounting in the form of a split bearing or mounting of two halves, which for convenience I will call the upper and lower sections 12 and 13 respectively, as I have illustrated the bearing as a whole resting upon the floor, although it is obvious that the bearing may be placed in position against the wall or against the ceiling, or may be placed in vertical or angular position. The lower section 13 of the mounting is provided with, or formed integral with a stand or bracket 14 of any desired form for securing the bearing as a whole in desired position. The upper section 12 of the mounting is rigidly but removably secured to the lower section 13 as by means of bolts 15. The meeting edges of the two sections 13 and 12 of the mounting may be conveniently provided with oppositely disposed longitudinal recesses 16 and projections 17 fitting each other in order to easily and accurately aline said two sections. The inner surface of the mounting is provided with longitudinally extending recesses 18 for the purposes hereinafter mentioned, and these recesses may most conveniently be provided half upon each of the meeting edges of the two sections as clearly indicated in Fig. 3 of the drawings. In the cylindrical cavity 19 of the mounting is placed the outer ball race member 20 in the form of a ring with the usual interiorly facing ball groove 21 in which roll the balls 22 with their other sides in the exteriorly facing ball groove 23 of inner ball race member 24. The outer ball race member 20 fits the inner surface of the mounting so as to directly transmit thereto the weight or strain of the bearing and so as to freely rotate in said mounting. Said outer ball race member is also slidably mounted in said mounting so as to move axially of the bearing and mounting.

The inner ball race member 24 is adapted to be secured to the rotating member in any desired way, as by having said ball race provided with a central aperture 25 fitting on to a reduced section 26 of a shaft 27, so that the shoulder 28 of the said shaft adjacent to reduced section 26 fits against the outer side of said inner ball race member, while a nut 29 engaging the screw-threaded portion of said shaft 27 bears against the opposite side of the inner ball race member 24 and holds said ball race member upon the end of said shaft. Against this, or the inner, side of the outer ball race member 20 rests the inner edge of thrust collar 30, which is slidably and also preferably rotatably mounted in the cavity of said mounting.

Slidably housed in the mounting recesses 18 are clamps 31 having their body portions 31$^a$ entirely countersunk from said cylindrical cavity 19 into said recesses 18 while their ends 31$^b$ project inwardly into said cavity and engage the outer side of the outer ball race member 20 and the outer side of the thrust collar 30. In this way the outer ball race member and the thrust collar are positively connected for axial movement together in either direction, but both the ball race member and the collar have all their weight and strain taken by the mounting and not by said clamps, and said ball race member and preferably also said collar are allowed free rotation in said mounting and free rotative action in said mounting independently of each other. Thrust collar 30 is provided with a hub or diaphragm portion 30$^a$ making said thrust collar cup-shaped.

It will now be noted that the ball bearing so located and connected to the mounting, as so far described, may be utilized in a great variety of places where an axial or longitudinal adjustment or movement of a ball bearing is desired, and that any desired form of means for either positively or yieldingly, or both positively and yieldingly adjusting the ball bearing in its mounting may be utilized by proper connection to said thrust collar 30 and still maintain all the advantages claimed for said bearing.

In order to more fully explain what I mean by suitable means for adjusting and holding the ball bearing proper in desired position in its mounting, I will describe briefly the means illustrated in the drawing herein; but it will be understood that my invention is not limited to this particular means of adjustment or holding.

Secured to the outer side and central part of the thrust collar hub 30$^a$, as by means of bolt 32, is one end of a short thrust shaft 33 extending through and rotatably mounted in a central aperture 34 of an end piece 35 secured to the right-hand end of the mounting, as illustrated in the drawings, as by means of bolts 36.

Beyond the bearing aperture 34 the thrust shaft 33 is of reduced diameter affording a shoulder 46 against which bears one end of thrust spring 37 encircling the adjacent reduced portion of shaft 33 and inclosed within the elongated hub 38 of end piece 35, while the opposite or outer end of said thrust spring 37 bears against the inner end of a hollow thrust plug 39 in which the thrust shaft 33 is slidably mounted. This thrust plug is exteriorly screw-threaded, engaging interior screw-threads in the hub 38 adjacent to the outer end of said hub. A check nut 48 encircling said thrust plug adjacent to the end of said hub binds said thrust plug in obvious manner wherever it is set in said hub.

Slightly back from its outer end the thrust plug 39 is provided with an angular faced portion 39$^a$ adapted to receive a wrench whereby said thrust plug may be rotated to shift its position relative to the hub 38. Beyond said angular faced portion said thrust plug has its end of reduced diameter and rotatively receives thereon the collar portion 40 of a quick release lever 41. Upon the collar portion of said quick release lever are cam faces 41$^a$ projecting against oppositely disposed cam faces 39$^c$ in the adjacent annular face portion 39$^a$ of the thrust plug 39. Against the outer edge of the collar portion 40 of said quick release lever 41 bears the inner edge of the hub 42 of adjusting wheel 43, which hub is in screw-threaded engagement with the screw-threaded outer end of short thrust shaft 33. Beyond the hub of this adjusting wheel a lock nut 44 engaging said screw-threaded shaft 33 in an obvious manner locks adjusting wheel 43 in desired position upon said shaft.

It will now be obvious that thrust spring 37 bearing at one end against the shoulder 46 of thrust shaft 33 and at its other end against thrust plug 39 when under proper tension tends to force the ball bearing to the left in the mounting, and that this pressing of the ball bearing to the left in its mounting is a yielding or spring-tensioned pressure adapted as shown in the drawing to allow the ball bearing to move backwardly or to the right in the mounting upon sufficient end thrust being transmitted through the shaft 27. The compression of thrust spring 37 and the relative position of the ball bearing may be in various ways adjusted by rotation of thrust plug 39 and adjusting wheel 43. Movement of quick release lever 31 so as to rotate its collar portion 40 in the direction indicated by the arrow thereon in Fig. 2, operates to at once withdraw the ball bearing toward the right an appreciable distance by the coöperation of cam faces 41$^a$ and 39$^c$, whereby the outer edge of said collar moves to the right and away from thrust plug 39 carrying therewith adjusting end 43 and thrust shaft 33 which is positively connected therewith.

The left end of the mounting is closed by an end piece 45 which fits closely enough about the rotating shaft 27 to prevent the entrance of dirt into the cavity of the mounting.

What I claim as new and desire to secure by Letters Patent is:

1. The combination in an axially adjustable ball bearing of an elongated mounting having longitudinal grooves therein, an interiorly grooved outer ball race member rotatably mounted in said mounting and movable longitudinally thereof, an oppositely disposed exteriorly grooved inner ball race member adapted to be secured to the end of a rotating member, balls in said race grooves, a thrust collar slidably mounted in said mounting and bearing against one edge of said outer ball race member, clamps slidably housed in the mounting grooves and having inwardly projecting ends engaging the non-contiguous edges of said thrust collar and said outer ball race member whereby said members are clamped to axially move together in said mounting but said race member is allowed independent rotative movement in said mounting and means for moving said thrust collar lengthwise of said mounting and holding it in place.

2. The combination in an axially adjustable ball bearing of an elongated mounting having longitudinal grooves therein, an interiorly grooved outer ball race member rotatably mounted in said mounting and movable longitudinally thereof, an oppositely disposed exteriorly grooved inner ball race member adapted to be secured to the end of a rotating member, balls in said race grooves, a thrust collar rotatably and slidably mounted in said mounting and bearing against one edge of said outer ball race member, clamps slidably housed in the mounting grooves and having inwardly projecting ends engaging the non-contiguous edges of said thrust collar and said outer ball race member whereby said members are clamped to axially move together in said mounting but allowed independent rotative movement in said mounting and means for moving said thrust collar lengthwise of said mounting and holding it in place.

In witness whereof I have affixed my signature, in the presence of two witnesses, this 15th day of October 1914.

EDMUND G. MUNSON.

Witnesses:
HARRIET WILLIAMS,
JAMES E. BREWER.